United States Patent
Yamazaki et al.

(10) Patent No.: US 8,145,097 B2
(45) Date of Patent: Mar. 27, 2012

(54) CONSTANT-VELOCITY JOINT AND IMAGE-FORMING DEVICE

(75) Inventors: Masayuki Yamazaki, Osaka (JP); Satoru Fukuzawa, Inabe (JP); Masaaki Ohashi, Inabe (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/964,042

(22) Filed: Dec. 9, 2010

(65) Prior Publication Data

US 2011/0081166 A1 Apr. 7, 2011

Related U.S. Application Data

(63) Continuation of application No. 11/231,754, filed on Sep. 22, 2005, now Pat. No. 7,877,043.

(30) Foreign Application Priority Data

Sep. 22, 2004 (JP) .................. 2004-275746
Sep. 22, 2004 (JP) .................. 2004-275764
Jul. 12, 2005 (JP) .................. 2005-203408

(51) Int. Cl.
*G03G 15/00* (2006.01)
(52) U.S. Cl. .......... 399/167; 464/137; 464/145
(58) Field of Classification Search ......... 399/159, 399/167, 116, 117, 36; 464/904–906; 384/523, 384/528
See application file for complete search history.

(56) References Cited

U.S. PATENT DOCUMENTS

| 3,399,937 A | 9/1968 | Vannest |
| 3,802,221 A | 4/1974 | Kimata |
| 5,855,519 A | 1/1999 | Kadota |
| 6,165,075 A | 12/2000 | Kita et al. |
| 2003/0045363 A1 | 3/2003 | Sugiyama et al. |
| 2005/0281586 A1 | 12/2005 | Ohashi et al. |

FOREIGN PATENT DOCUMENTS

| JP | 52-34699 | 9/1977 |
| JP | 63-040625 | 3/1988 |
| JP | 3-130431 | 12/1991 |

(Continued)

OTHER PUBLICATIONS

Japanese Office Action issued Feb. 5, 2010 in corresponding Japanese Application 2005-266786 (with English translation).

(Continued)

*Primary Examiner* — David Gray
*Assistant Examiner* — Laura Roth
(74) *Attorney, Agent, or Firm* — Wenderoth, Lind & Ponack, L.L.P.

(57) ABSTRACT

A constant-velocity joint includes an outer ring having an annular space therein and an opening at one axial end thereof. The annular space is defined by a radially outer wall and a radially inner wall of the outer ring. At least one of the radially outer wall and the radially inner wall has three axially extending track grooves circumferentially spaced apart from each other by 120 degrees. A cage is inserted in the annular space. The cage has pockets at positions corresponding to the track grooves, respectively. A ball is received in each of the pockets so as to roll along one of the track grooves. A pair of diametrically opposed protrusions is formed at radially inner and outer open ends of the pockets of the cage to prevent the balls from coming out of the pockets of the cage.

12 Claims, 4 Drawing Sheets

FOREIGN PATENT DOCUMENTS

| | | |
|---|---|---|
| JP | 04-368656 | 12/1992 |
| JP | 50-60501 | 3/1993 |
| JP | 5-62741 | 8/1993 |
| JP | 05-062741 | 8/1993 |
| JP | 5-341589 | 12/1993 |
| JP | 08-320026 | 12/1996 |
| JP | 08320026 A * | 12/1996 |
| JP | 09-088953 | 3/1997 |
| JP | 9-151954 | 6/1997 |
| JP | 2000-257646 | 9/2000 |
| JP | 2001-11535 | 1/2001 |
| JP | 2002-213480 | 7/2002 |
| JP | 2003-65350 | 3/2003 |
| JP | 2003-097590 | 4/2003 |

OTHER PUBLICATIONS

Notice of Reasons for Rejection (with partial English translation) issued May 25, 2010 in corresponding Japanese Application No. 2005-203408.

* cited by examiner

CONSTANT-VELOCITY JOINT AND IMAGE-FORMING DEVICE

CONTINUITY INFORMATION

This application is a continuation of U.S. application Ser. No. 11/231,754, filed Sep. 22, 2005, now U.S. Pat. No. 7,877,043 the entirety of which is incorporated herein by reference.

BACKGROUND OF THE INVENTION

1. Field of the Invention

This invention relates to a constant-velocity joint through which a driving shaft and a driven shaft are adapted to be coupled together so as to transmit torque from the driving shaft to the driven shaft, and an image forming device.

2. Description of the Related Art

A constant-velocity joint is typically used to transmit torque from a vehicle drive shaft to an axle.

Through such a constant-velocity joint, torque can be transmitted from a driving shaft to a driven shaft such that the driven shaft is rotated at a constant speed even if the angle between the driving shaft and the driven shaft varies. Thus, constant-velocity joints are used in various industrial machines other than motor vehicles, too.

Two types of constant-velocity joints are known: fixed type constant-velocity joints, which only allow the driving and driven shafts to incline relative to each other; and sliding type constant-velocity joints, which allow the driving and driven shafts not only to incline, but also to axially slide relative to each other. A sliding type constant-velocity joint is disclosed in Japanese Patent Publication JP 52-34699 (examined).

The constant-velocity joint disclosed in JP 52-34699 includes an outer ring and an inner member coaxial with the outer ring. A cage is mounted in an annular space defined between the outer ring and the inner member. One of the radially inner and outer walls defining the annular space is formed with three track grooves circumferentially spaced apart from each other at intervals of 120 degrees. Pockets are formed in the cage, each radially aligned with one of the track grooves. A ball is mounted in each of the pockets so as to roll along the track groove. Torque is thus transmitted between the outer ring and the cage through the balls.

Japanese Patent Publication JP 5-341589 (unexamined) discloses an image forming device which includes a photoconductor drum, a motor, and a universal joint through which the shaft of the photoconductor drum and the rotary shaft of the motor are coupled together. The light exposure position and the image transfer position are arranged diametrically opposed to each other on the photoconductor drum so as to cancel any circumferential shrinkage and expansion of images due to fluctuations in the rotational speed of the photoconductor drum at the light exposure position and the image transfer position, so that the transferred images will be substantially free of shrinkage and expansion.

Conventional constant-velocity joints have their outer ring, inner member, cage, and balls all made of a metal or metals. Thus, grease is needed for lubrication of these parts. In order to prevent leakage of grease, it is necessary to close the open end of the outer ring with a boot mounted on the outer ring by tightening a boot band.

Thus, in order to assemble and disassemble the constant-velocity joint, it is necessary to mount and dismount the boot, which is troublesome. Therefore, it is extremely troublesome to replace any damaged or broken parts of the input and output devices between which torque is transmitted through the constant-velocity joint.

While such metal conventional constant-velocity joints are high in strength, they are heavy, need grease lubrication, and tend to produce large operating noise. Their use is therefore limited. For example, they are not suitable for use in office machines, audio devices, medical instruments, food producing machines, household appliances, etc.

In the image forming device disclosed in JP 5-341589, since the universal joint is the non-constant-velocity type, the photoconductor drum cannot be rotated at a constant speed. Although this publication proposes to arrange the exposure position and the transfer position diametrically opposite to each other, it is actually difficult to arrange the above two positions exactly diametrically opposite to each other due to assembling errors and/or inclination of the photoconductor drum. Thus, it will be difficult to completely cancel any shrinkage and expansion of the latent image with the shrinkage and expansion of the toner image. The ultimately obtained image thus tends to be low in quality.

Further, such non-constant-velocity joints do not permit easy disassembling of the input and output devices that are coupled together thorough the joint. In particular, it is troublesome to replace parts of the image forming device such as the photoconductor drum. Maintenance is thus difficult.

An object of the present invention is to provide a constant-velocity joint of which input and output parts can be exchanged easily, which can be easily assembled and disassembled, which needs no lubrication with grease, which is lightweight, compact in size, quiet in operation, and which is less limited in utility.

Another object of the present invention is to provide an image forming device which includes a means for always rotating the photoconductor drum at a constant speed, and of which the maintenance is easy.

SUMMARY OF THE INVENTION

According to the present invention, there is provided a constant-velocity joint comprising: an outer ring formed with an opening at a first axial end thereof, and a radially outer wall and a radially inner wall which define an annular space therein, at least one of the radially outer wall and the radially inner wall being formed with three axially extending track grooves circumferentially spaced apart from each other by 120 degrees; a cage inserted in the annular space and formed with pockets at positions corresponding to the track grooves, respectively; a plurality of balls, one of the balls received in each of the pockets so as to roll along one of the track grooves; and a plurality of arrangements for preventing the balls from coming out of the pockets of the cage, the arrangements being provided at radially inner and outer open ends of the pockets of the cage.

Each of the arrangements for preventing the balls from coming out may comprise a plurality of protrusions formed so as to be circumferentially spaced apart from each other.

Preferably, a tapered surface is formed so as to extend from one axial end of each of the track grooves that is near an axial end of the annular space to the axial end of the annular space, the tapered surfaces taper such that a diameter of the annular space gradually increases toward the axial end of the annular space. With this arrangement, the balls can be easily inserted between the tapered surfaces. With the balls inserted between the respective tapered surfaces, the balls can be guided smoothly into the track grooves by simply rotating the outer ring and the cage relative to each other. Thus, even if the balls are not accurately axially aligned with the respective track grooves, the balls can be smoothly inserted into the respective grooves, so that the constant-velocity joint can be assembled easily.

Preferably, the outer ring is formed of a synthetic resin to eliminate the necessity for lubrication with grease, reduce the weight of the constant-velocity joint, and reduce noise while torque is being transmitted.

Preferably, the cage is also formed of a synthetic resin to further reduce the weight of the constant-velocity joint and reduce noise while torque is being transmitted.

In this case, if the cage is formed of a synthetic resin, the protrusions are formed simultaneously when molding the cage. Thus, if the protrusions are unnecessarily long, they tend to break when the cage is released from the mold. If they are too short, they cannot prevent the balls from coming out. Thus, the inscribed circle of the protrusions preferably has a diameter that is 70 to 99 percent of the diameter of the balls.

The synthetic resin is preferably an injection-moldable synthetic resin so that the outer ring and the cage can be formed easily. By using a synthetic resin having lubricity, it is possible to further improve the lubricity of the ball rolling surfaces, which further reduces the operating noise of the constant-velocity joint.

According to another aspect of the present invention, there is provided an image forming device comprising a photoconductor drum having drum shafts, a driving unit having a drive shaft for driving the photoconductor drum, a light exposure unit for forming an electrostatic latent image on the photoconductor drum, a developing unit for supplying toner to the electrostatic latent image on the photoconductor drum to form a toner image, a transfer unit for feeding a transfer material at the same speed as a peripheral speed of the photoconductor drum to transfer the toner image onto the transfer material, and the above-described constant-velocity joint, through which the drive shaft of the driving unit is coupled to one of the drum shafts of the photoconductor drum.

The arrangements for preventing the balls from coming out reliably keep the balls from separating from the cage even when the cage is not inserted in the outer ring. The constant-velocity joint can thus be extremely easily assembled and disassembled.

By forming the outer ring from a synthetic resin, no lubrication with grease is necessary, which in turn eliminates the need for a boot for preventing leakage of grease. It is also possible to reduce the weight of the constant-velocity joint, reduce the operating noise while torque is being transmitted, and reduce the torque loss.

Such a constant-velocity joint is less limited in utility. For example, the constant-velocity joint according to the present invention can be used in office machines, audio devices, medical devices, household appliances, and other devices and instruments in which it was difficult to use conventional constant-velocity joints. This increases the freedom of design of these devices and instruments and reduces their size and cost.

By coupling the drive shaft of the driving unit with one of the drum shafts of the photoconductor drum through a constant-velocity joint, the photoconductor drum can be rotated at a constant speed even if the drum shafts of the photoconductor drum and the rotary shaft of the motor are inclined relative to each other or otherwise not aligned with each other.

By rotating the photoconductor drum at a constant speed, it is possible to prevent shrinkage or expansion of any electrostatic latent image formed on the photoconductor drum, and also to prevent any toner image on the photoconductor drum from shrinking or expanding when it is transferred onto the transfer material by the transfer/electrifier. Thus, it is possible to form high-quality images.

Since the constant-velocity joint can be easily assembled by simply inserting the cage into the outer ring and easily disassembled by simply pulling the cage out of the outer ring, parts of the image forming device such as the photoconductor drum can be easily replaced with new ones. Maintenance of the image forming device is thus easy. Since no lubrication with grease is necessary, it is possible to completely eliminate the possibility of the transfer material A being soiled with grease.

BRIEF DESCRIPTION OF THE DRAWINGS

Other features and objects of the present invention will become apparent from the following description made with reference to the accompanying drawings, in which.

DETAILED DESCRIPTION OF THE INVENTION

Figure 1:
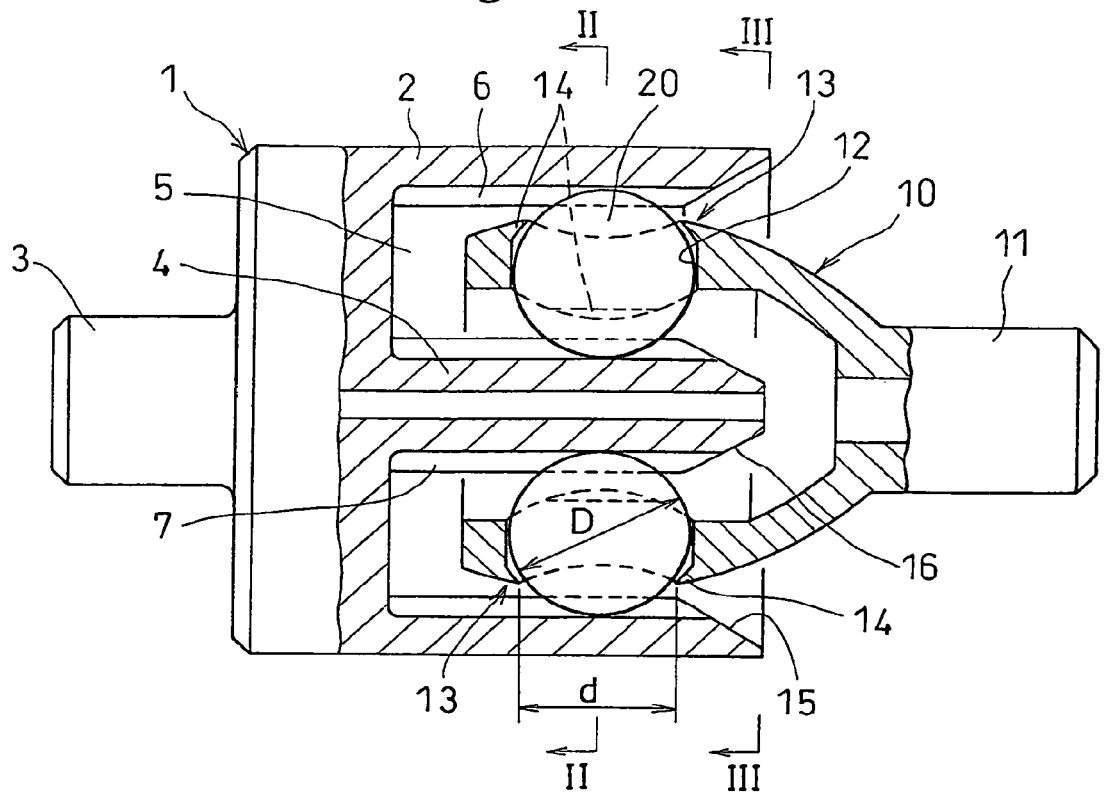
FIG. 1 is a vertical sectional front view of a first embodiment of a constant-velocity joint according to the present invention.
Figure 2:
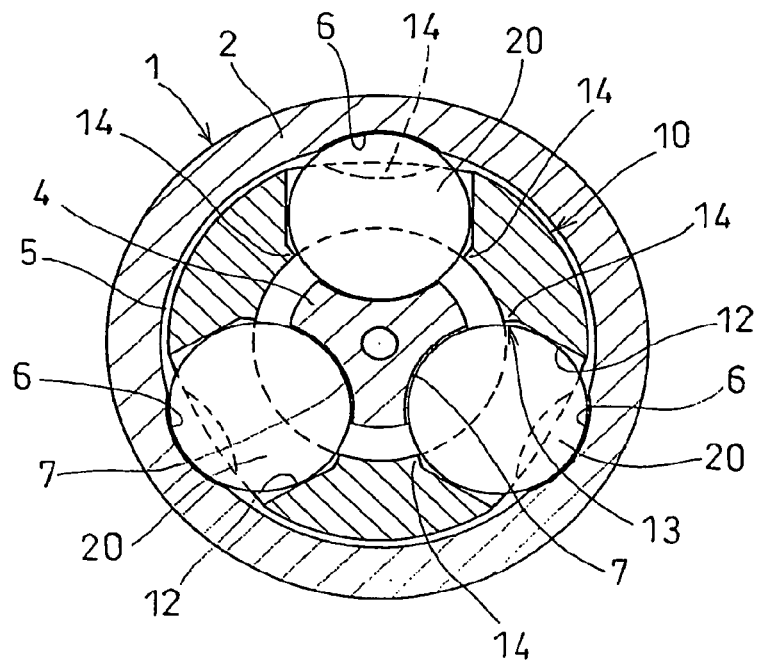
FIG. 2 is a sectional view taken along line II-II of FIG. 1.

Now referring to the drawings, FIGS. 1 and 2 show the first embodiment of a constant-velocity joint according to the present invention. It comprises an outer ring 1, a cage 10, and balls 20.

The outer ring 1 includes a cup 2 having an opening at one end, and an end wall closing the other end thereof. A first shaft 3 is integrally formed on the outer surface of the end wall of the cup 2. A guide shaft 4 extends from the inner surface of the end wall along the axis of the outer ring 1 to define an annular space between the guide shaft 4 and the cup 2. Three track grooves 6 and three track grooves 7 are formed in the radially inner surface of the cup 2, which defines the radially outer wall of the annular space 5, and in the outer surface of the guide shaft 4, which defines the radially inner wall of the annular space 5, respectively. The track grooves 6 and 7 are circumferentially spaced apart from each other at equal intervals of 120 degrees.

The track grooves 6 or the track grooves 7 may be omitted.

The cage 10 is received in the annular space 5 defined in the outer ring 1. A second shaft 11 is integrally formed on the end of the cage 10 protruding from the open end of the annular space 5.

The cage 10 is formed with three pockets 12 each corresponding to one of the three track grooves 6 and one of the three track grooves 7. Each of the balls 20 is received in one of the pockets 12 so as to roll along one of the track grooves 6 and one of the track grooves 7.

As shown in FIGS. 1 and 2, each pocket 12 is provided with arrangements 13 for preventing the ball from coming out of the pocket at its radially inner and outer openings.

Each arrangement 13 comprises a pair of diametrically opposed protrusions 14.

The outer ring 1 and the cage 10 may be formed of a metal or formed of a synthetic resin. If they are formed of a synthetic resin, no lubrication with grease or any other lubricant is necessary, so that it is possible to reduce noise while torque is being transmitted, and also to reduce the weight of the entire joint. Thus, in the first embodiment, both the outer ring 1 and the cage 10 are formed of a synthetic resin. But, only the outer ring 1 may be formed of a synthetic resin. A suitable synthetic resin should be selected taking into consideration the environment of use. Preferably, an injection-moldable synthetic resin is selected. If an injection-moldable resin is selected, it may be either a thermoplastic resin or a thermosetting one.

Some injection-moldable resins are crystalline and others are amorphous. While either type is usable in the present invention, a crystalline resin is preferable because an outer ring and/or a cage made of an amorphous resin tends to break suddenly if torque above an upper limit is applied due to low toughness of the amorphous resin.

Preferable synthetic resins include synthetic resins that are high in lubricity, such as polyacetal resins (POM), nylon resins, injection-moldable fluororesins including perfluoroalkoxyethylene (PFA), fluoroethylenepropylene (FEP) and polyethylene-tetrafluoroethylene (ETFE), and injection-moldable polyimide resins, polyphenylene sulfide resins (PPS), full aromatic polyester resins, polyether ether ketone resins (PEEK) and polyamide-imide resins.

The outer ring 1 and the cage 10 may be made of only one of these resins, a polymer alloy which is a mixture of two or more of these resins, or a polymer alloy which is a mixture of a synthetic resin other than the above-mentioned resins which is lower in lubricity, and at least one of the above-mentioned synthetic resins.

Further, the outer ring 1 and the cage 10 may be made only of a synthetic resin that is low in lubricity if its lubricity is improved by adding a solid lubricant or a lubricating oil thereto. The solid lubricant added may be polytetrafluoroethylene, graphite or molybdenum disulfide.

In order to increase the strength of the outer ring and the cage, glass fibers, carbon fibers or mineral fibers (whiskers) may be added to the synthetic resin or resins. Solid lubricants may be used together with such fibers.

Most preferably, the outer ring 1 and the cage 2 are formed of POM, a nylon resin, PPS or PEEK. The nylon resin used may be nylon 6, nylon 66, nylon 610, nylon 612, nylon 11, nylon 12, nylon 46 or a semi-aromatic nylon having an aromatic ring in its molecular chain. Because POM, nylon resins and PPS are sufficiently heat-resistant, high in lubricity, and relatively inexpensive, by using one or more than one of these materials, a high-performance, cost effective constant-velocity joint is provided. PEEK provides superior mechanical strength and lubricity without adding a reinforcing material or a lubricant. Thus, by using PEEK, a high-performance constant-velocity joint is provided.

As is apparent from the above description, since the outer ring 1 and the cage 10 are made of a synthetic resin, the constant-velocity joint is lightweight, and produces little noise while torque is being transmitted therethrough. No grease is necessary for lubrication.

The constant-velocity joint of the present invention can therefore be used in a wide variety of devices and machines, including food processing machines.

If the outer ring 1 and the cage 10 are formed of a sintered oil-containing metal, neither grease nor a boot is necessary even though the outer ring and the cage are formed of a metal. Parts of the constant-velocity joint can thus be exchanged easily and smoothly.

The balls 20 may be made of bearing steel, stainless steel, ceramic material or synthetic resin. But preferably, the balls 20 are made of stainless steel, a ceramic material or a synthetic resin to prevent rust even without lubrication. Among them, a synthetic resin is most preferable because balls made of a synthetic resin are lightweight and produce less noise.

If the constant-velocity joint is used in a medical instrument or a food preparation machine, the balls 20 are preferably formed of stainless steel or ceramic material to avoid environmental concerns. If the balls 20 are made of a synthetic resin, a lightweight and quiet constant-velocity joint is obtained. Also, if the outer ring is made of a synthetic resin, a white or whitish resin should be used to give users hygienic impressions. Among such synthetic resins, POM is the most preferable because it is whitish in color and high in lubricity, thereby eliminating the need for grease.

If the cage is formed of an injection-moldable synthetic resin, the protrusions 14 are formed simultaneously when molding the cage 10. Thus, if the protrusions 14 are unnecessarily long, they tend to break when the cage is released from the mold. If they are too short, they cannot prevent the balls 20 from coming out.

Thus, the protrusions 14 have such a length that their inscribed circle has a diameter d that is 70 to 99% of the diameter D of the balls 20.

The number of protrusions 14 is not particularly limited. Or, instead of a plurality of protrusions 14, each arrangement 13 may comprise a single, continuous, annular protrusion. Also, each arrangement 13 is not limited to a protrusion or protrusions 14, but may comprise a snap ring or an O-ring fitted in an open end of one of the pockets 12, or may comprise a hole formed in a cover placed on the cage so as to correspond to one of the pockets 12.

By providing each pocket 12 with the arrangements 13 for preventing the ball 20 from coming out of the pocket 12 and forming the outer ring 1 and the cage 10 from a synthetic resin, thereby eliminating the need for lubrication with grease, the constant-velocity joint can be assembled by simply inserting the cage into the annular space 5 defined in the outer ring 1 or disassembled by simply pulling the cage out of the annular space 5 with the balls 20 securely and reliably held in the respective pockets 12.

Thus, the constant-velocity joint according to the present invention can be easily assembled and disassembled, so that any damaged or broken parts of the input and output devices between which torque is transmitted through the constant-velocity joint can be dismounted easily for replacement.

Figure 3:
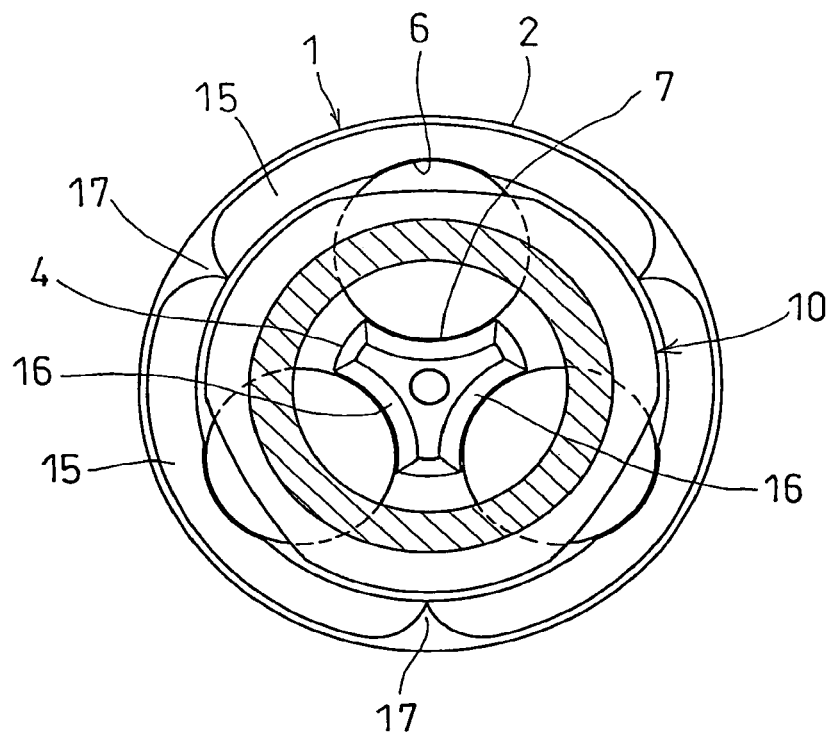
FIG. 3 is a sectional view taken along line III-III of FIG. 1.

As shown in FIGS. 1 and 3, tapered surfaces 15 and 16 extend from the respective track grooves 6 and 7 to the open end of the outer ring 1 so that the diameter of the annular space 5 gradually increases toward the open end of the outer ring 1. With this arrangement, the balls 20 can be easily inserted between the tapered surfaces 15 and 16. With the balls 20 inserted between the respective tapered surfaces 15 and 16, the balls 20 can be guided smoothly into the track grooves 6 and 7 by simply rotating the outer ring 1 and the cage 10 relative to each other. Thus, even if the balls 20 are not accurately axially aligned with the respective track grooves 6 and 7, the balls 20 can be smoothly inserted into the respective grooves 6 and 7, so that the constant-velocity joint can be assembled easily.

Figure 4:
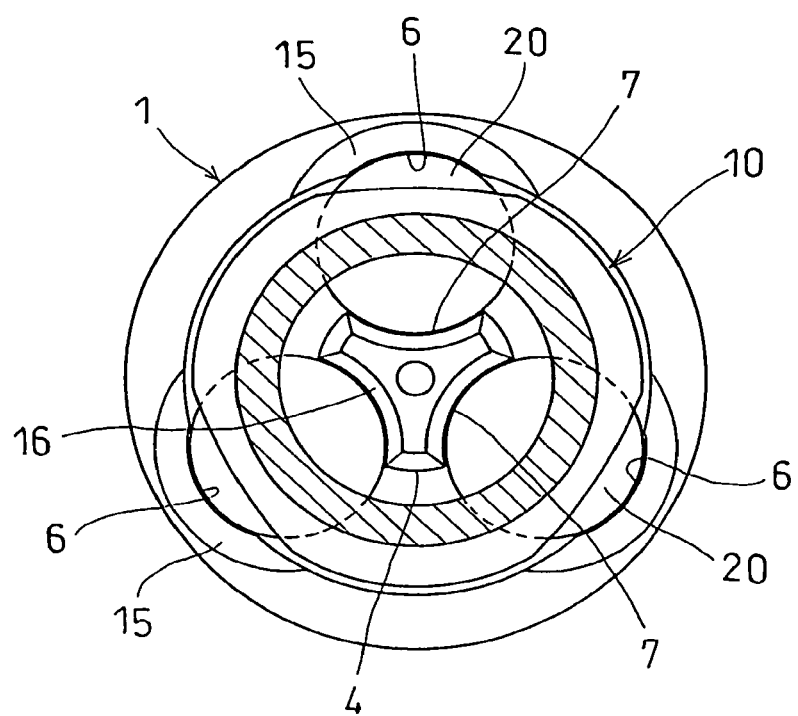
FIG. 4 is a sectional view of a second embodiment of a constant-velocity joint according to the present invention.

The tapered surfaces 15 may have their axes located on the axis of the outer ring 1 as shown in FIG. 3, or on the pitch circle of the balls 20 as shown in FIG. 4.

In the first embodiment shown in FIG. 3, small guide protrusions 17 are formed between the adjacent tapered surfaces 15. Since the tapered surfaces 15 are present substantially over the entire circumference of the outer ring 1, the constant-velocity joint can be assembled practically without taking into consideration the angular position of the cage relative to the outer ring.

In the first embodiment, the cage 10 and the second shaft 11 are formed of a synthetic resin so as to be integral with each other. But instead, the second shaft 11 may be made of a ceramic material or a metal such as steel, stainless steel or an aluminum alloy, and joined to the cage 10, which is made of a synthetic resin, by bolts or any other means.

If the second shaft 11 has a length greater than the overall length of the constant-velocity joint except the shaft 11, in order to minimize torque loss, the second shaft 11 is preferably formed of a ceramic material or a metal.

In the first embodiment, a preload may be applied to the balls 20 by the resilience of the outer ring 1. Specifically, by setting the diameter of the circle defined by each pair of radially opposed track grooves 6 and 7 at a value slightly smaller than the diameter of the balls 20, it is possible to apply a preload to the balls 20. By applying a preload to the balls 20, it is possible to eliminate circumferential plays in the constant-velocity joint, thereby improving the isokinetic properties of the joint. This is possible because the outer ring 1 is made of a synthetic resin.

Figure 5:
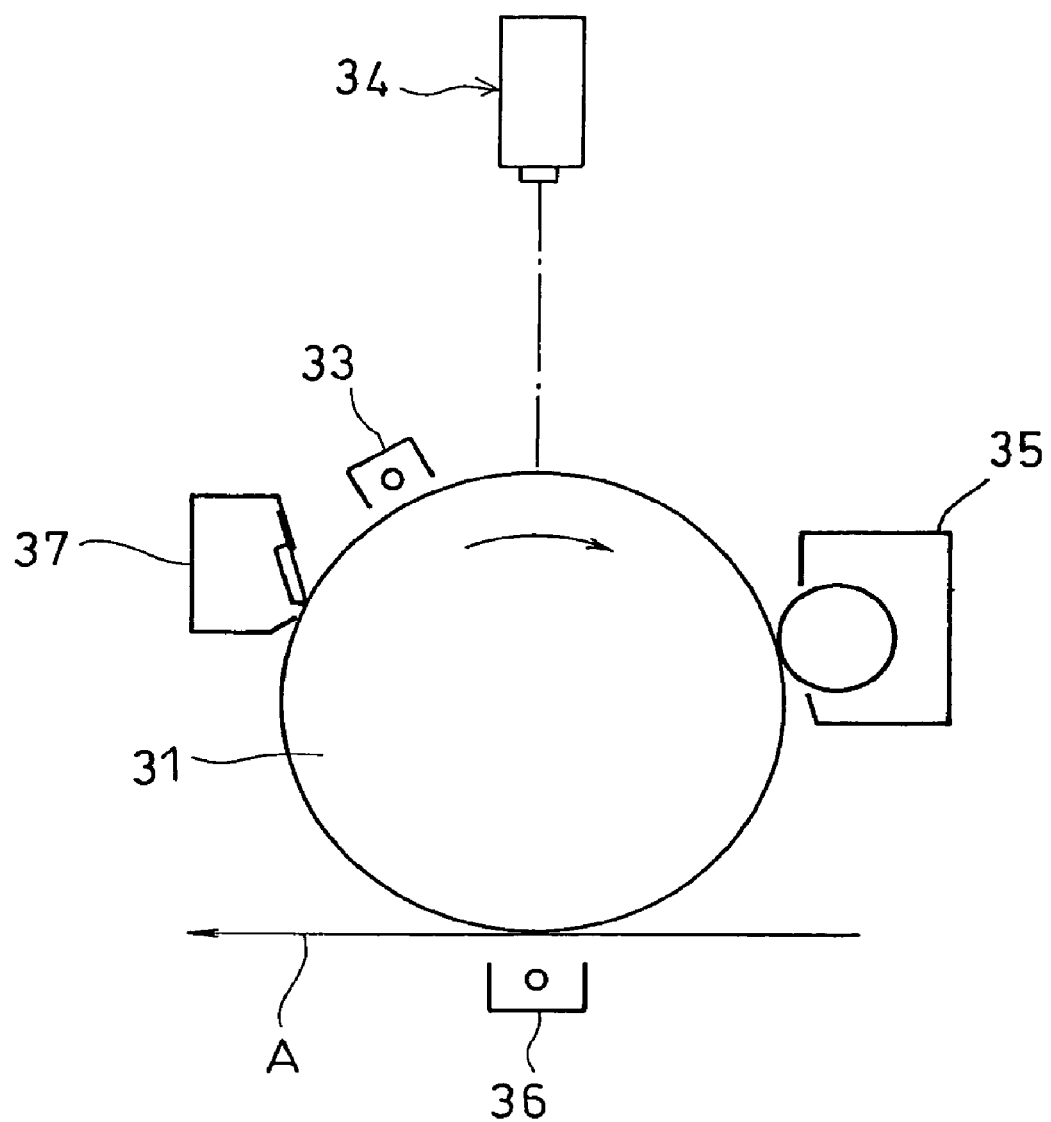
FIG. 5 is a schematic view of an image forming device according to the present invention.
Figure 6:
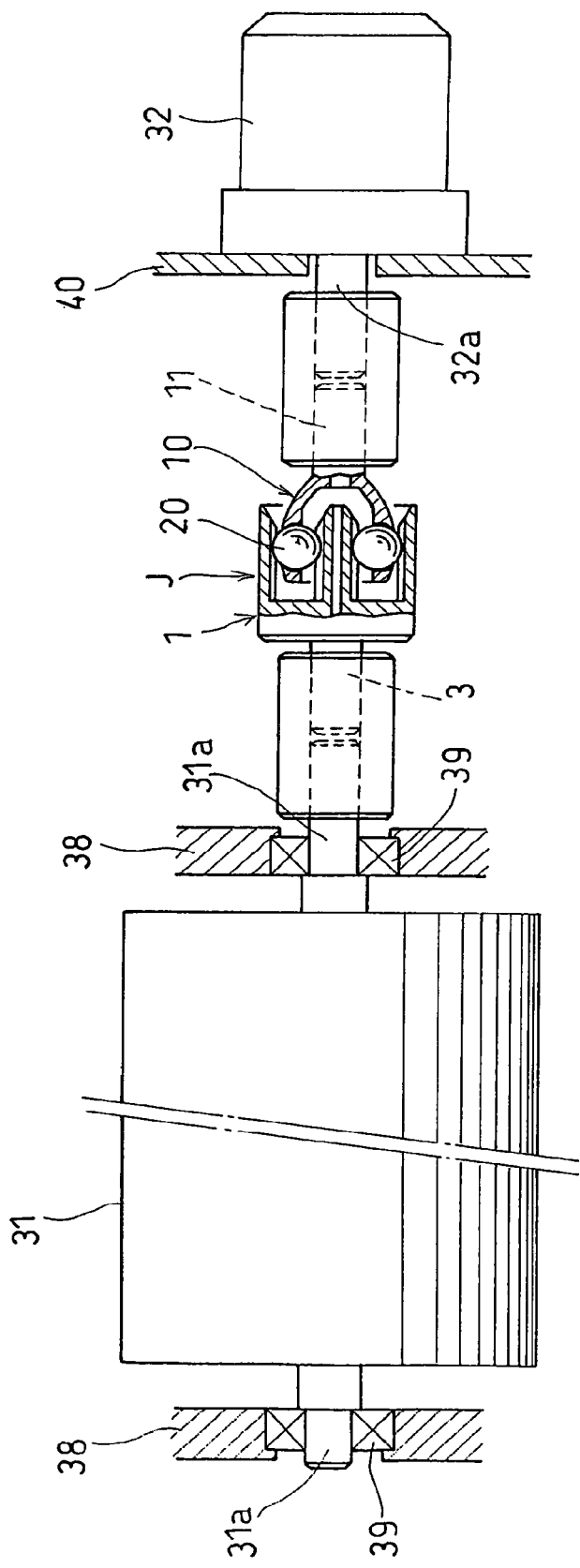
FIG. 6 is a partially cutaway front view of the driving unit for driving the photoconductor drum of the image forming device illustrated in FIG. 5.

FIGS. 5 and 6 show an image forming device according to the present invention. FIG. 5 shows a monochrome image forming device having a photoconductor drum 31 which is driven by a motor 32 (shown in FIG. 6) in the direction of the arrow in FIG. 5. Around the photoconductor drum 31, an electrifier 33, a light exposure unit 34, a developing unit 35, a transfer/electrifier 36 and a cleaner 37 are arranged in this order in the direction of rotation of the photoconductor drum 31.

While the photoconductor drum 31 is rotating, the electrifier 33 uniformly electrostatically charges the outer periphery of the photoconductor drum 31, the light exposure apparatus 34 then emits image-forming light based on image information onto the drum 31 to form an electrostatic latent image on the drum 31, the developing unit 35 supplies toner onto the latent image to form a toner image, and the toner image is transferred onto a transfer material A that is being fed by the transfer/electrifier 36 at the same speed as the peripheral speed of the photoconductor drum 31 to form an image on the transfer material A. After transferring the image, any toner remaining on the drum 31 is removed by the cleaner 37.

As shown in FIG. 6, the photoconductor drum 31 carries drum shafts 31a at both ends, each rotatably supported on one of a pair of side frames 38 through a bearing 39. The motor 32 for driving the photoconductor drum 31 is mounted on a casing 40 so as to axially oppose the photoconductor drum 31.

The rotary shaft 32a of the motor 32 is connected to one of the drum shafts 31a of the photoconductor drum 31 through a constant-velocity joint J.

As the constant-velocity joint J, the first embodiment shown in FIGS. 1 to 3, or the second embodiment shown in FIG. 4 is used.

The constant-velocity joint J allows the photoconductor drum 31 to rotate at a constant speed even if the drum shafts 31a of the photoconductor drum 31 and the rotary shaft 32a of the motor 32 are inclined relative to each other or otherwise not aligned with each other. By rotating the photoconductor drum 31 at a constant speed, it is possible to prevent shrinkage or expansion of any electrostatic latent image formed on the photoconductor drum 31, and also to prevent any toner image on the photoconductor drum 31 from shrinking or expanding when it is transferred onto the transfer material A by the transfer/electrifier 36.

Thus, it is possible to form high-quality images. Also, because the light exposure unit 34 and the transfer/electrifier 36 need not be arranged so as to be diametrically opposite to each other, the image forming device can be designed more freely.

By forming the outer ring 1 and the cage 10 of the constant-velocity joint from a synthetic resin, it is possible to eliminate the need for lubrication with grease, which in turn completely eliminates the possibility of the transfer material A being soiled with splashed grease.

Since the constant-velocity joint can be easily assembled by simply inserting the cage into the outer ring and easily disassembled by simply pulling the cage out of the outer ring, parts of the image forming device such as the photoconductor drum 31 can be easily replaced with new ones. Maintenance of the image forming device is thus easy.

The image forming device shown in FIG. 5 is a monochrome image forming device. A full-color image forming apparatus comprises four of the monochrome image forming devices illustrated in FIG. 5 that are arranged in tandem in the feed direction of the transfer material A. In the respective image forming devices, yellow, magenta, cyan and black toners are used to form toner images of four different colors, and the toner images are superposed on the transfer material A to form a color image.

What is claimed is:

1. A constant-velocity joint comprising:
    an outer ring having an opening at a first axial end thereof, said outer ring including a radially inner wall and a radially outer wall which define an annular space therein, at least one of said radially outer wall and said radially inner wall having three axially extending track grooves circumferentially spaced apart from each other by 120 degrees;
    a cage shaped to be inserted in said annular space, said cage including a synthetic resin and a plurality of pockets having a radially inner open end and a radially outer open end, said pockets disposed at positions corresponding to said track grooves, respectively; and
    a plurality of balls, each ball of the plurality of balls received in a respective pocket of said plurality of pockets, so as to roll along said track grooves;
    wherein said cage includes a plurality of arrangements disposed at said pockets, said plurality of arrangements configured to prevent said balls from radially outwardly or radially inwardly coming out of said pockets, when said cage is pulled out of said outer ring with said each ball of said plurality of balls received in said respective pocket of said plurality of pockets, said arrangements being disposed at said radially inner and outer open ends of said pockets, whereby said cage is configured to be inserted into and pulled out of said outer ring with said each ball of said plurality of balls received in said respective pocket of said plurality of pockets;
    wherein no lubricating grease is disposed in the annular space and no boot is mounted for preventing leakage of lubricating grease, such that one end of said outer ring is open; and
    wherein each of said track grooves has an axial end near said first axial end of said outer ring, and a tapered surface that tapers outward from each said axial end to said first axial end of said outer ring, such that the diameter of said annular space increases toward said first axial end of said outer ring.

2. The constant-velocity joint of claim 1, wherein each of said arrangements comprises a plurality of protrusions which are circumferentially spaced apart from each other.

3. The constant velocity joint of claim 2, wherein said protrusions define an inscribed circle having a diameter that is 70 to 99 percent of the diameter of said balls.

4. The constant-velocity joint of claim 1, wherein said outer ring comprises a synthetic resin.

5. The constant-velocity joint of claim 4, wherein said synthetic resin is an injection-moldable synthetic resin.

6. The constant-velocity joint of claim 5, wherein said synthetic resin has lubricity.

7. An image forming device comprising:
- a photoconductor drum having a plurality of drum shafts;
- a driving unit having a drive shaft for driving said photoconductor drum;
- a light exposure unit for forming an electrostatic latent image on said photoconductor drum;
- a developing unit for supplying a toner to said electrostatic latent image on said photoconductor drum to form a toner image;
- a transfer unit for feeding a transfer material at a peripheral speed of said photoconductor drum to transfer said toner image onto said transfer material; and
- a constant-velocity joint through which said drive shaft of said driving unit is coupled to one of said drum shafts of said photoconductor drum, said constant velocity joint comprising:
- an outer ring having an opening at a first axial end thereof, said outer ring including a radially inner wall and a radially outer wall which define an annular space therein, at least one of said radially outer wall and said radially inner wall having three axially extending track grooves circumferentially spaced apart from each other by 120 degrees;
- a cage shaped to be inserted in said annular space, said cage including a synthetic resin and a plurality of pockets having a radially inner open end and a radially outer open end, said pockets disposed at positions corresponding to said track grooves, respectively;
- a plurality of balls, each ball of the plurality of balls received in a respective pocket of said plurality of pockets, so as to roll along said track grooves;
- wherein said cage includes a plurality of arrangements disposed at said pockets and configured to prevent said balls from radially outwardly or radially inwardly coming out of said pockets, when said cage is pulled out of said outer ring with each ball of said plurality of balls received in said respective pocket of said plurality of pockets, said arrangements being disposed at said radially inner and outer open ends of said pockets, whereby said cage is configured to be inserted into and pulled out of said outer ring with said each ball of said plurality of balls received in said respective pocket of said plurality of pockets;
- wherein no lubricating grease is disposed in the annular space and no boot is mounted for preventing leakage of lubricating grease, such that one end of said outer ring is open; and
- wherein each of said track grooves has an axial end near said first axial end of said outer ring, and a tapered surface that tapers outward from each said axial end to said first axial end of said outer ring, such that the diameter of said annular space increases toward said first axial end of said outer ring.

8. The image forming device of claim 7, wherein each of said arrangements comprises a plurality of protrusions which are circumferentially spaced apart from each other.

9. The image forming device of claim 8, wherein said protrusions define an inscribed circle having a diameter that is 70 to 99 percent of the diameter of said balls.

10. The image forming device of claim 7 wherein said outer ring comprises a synthetic resin.

11. The image forming device of claim 10, wherein said synthetic resin is an injection-moldable synthetic resin.

12. The image forming device of claim 11, wherein said synthetic resin has lubricity.

* * * * *